POLARITY SAMPLED AVERAGING DEVICE
Filed Sept. 30, 1963
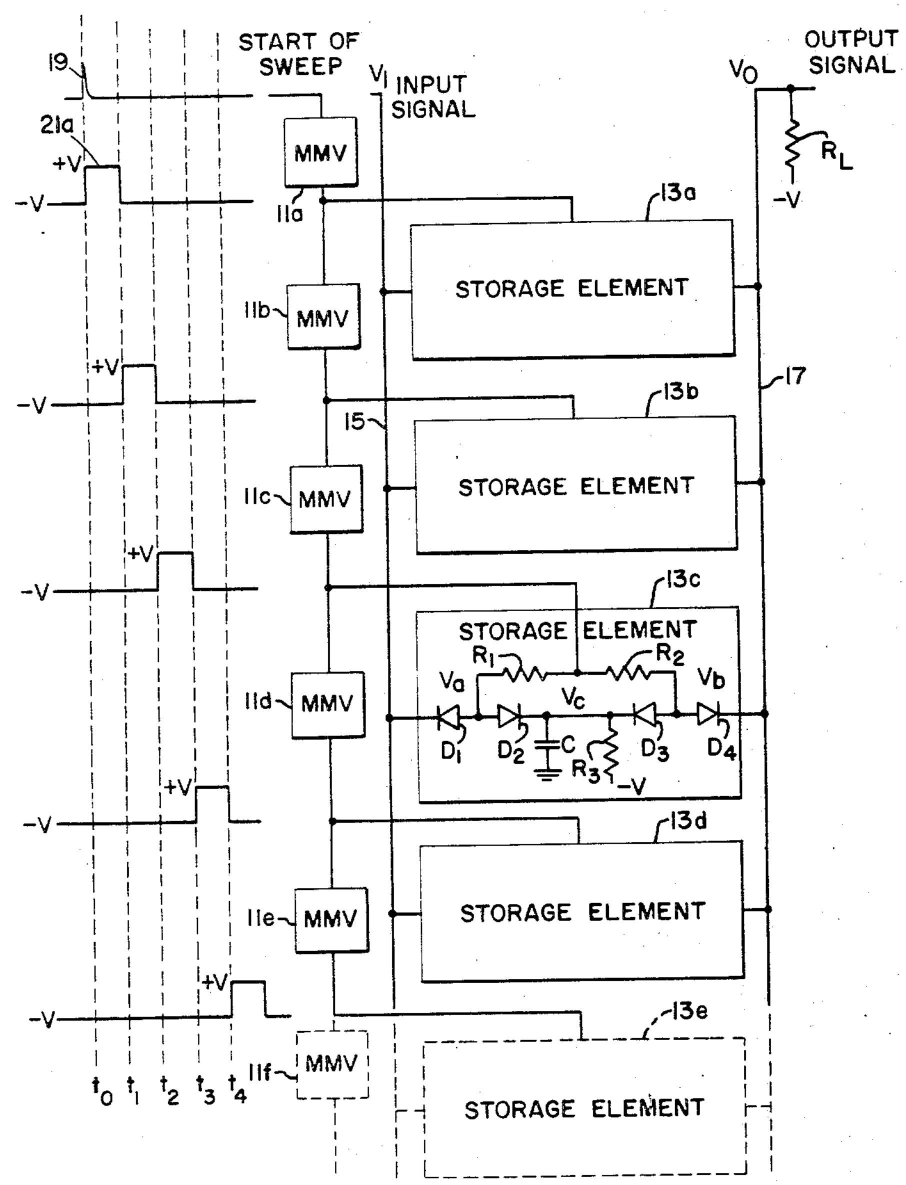
INVENTOR
Cabell N. Pryor Jr.
BY N. Jnonfeld
ATTORNEY

United States Patent Office 3,344,262
Patented Sept. 26, 1967

3,344,262

POLARITY SAMPLED AVERAGING DEVICE

Cabell N. Pryor, Jr., Silver Spring, Md., assignor to the United States of America as represented by the Secretary of the Navy Filed Sept. 30, 1963, Ser. No. 312,806
4 Claims. (Cl. 235—183)

The invention described herein may be manufactured and used by or for the Government of the United States of America for governmental purposes without the payment of any royalties thereon or therefor.

This invention relates to a circuit for storing information and more particularly to an information storage system employing a capacitor storage element.

In the development of the delay time compression devices, i.e. Deltics, for use in correlation the need arose for some type of post integrator for smoothing the output of the correlator, since thhe integration time of the correlator is in the order of 25 milliseconds and weak signals from the correlograms cannot be observed directly. In providing a post integrator for smoothing or averaging the signals from the correlator, the effective integration time must be made large enough to reduce the statistical noise from the correlator below the level of the smallest signal to be observed.

With the present invention a post integrator has been produced by employing capacitors as averaging devices. Continuous discrete pulse width samples are taken from an entire correlogram or signal produced from a correlator. Each of these discrete pulse widths for a particular signal are applied to a separate capacitor. If the signal thus sampled is greater in magnitude than the charge existing on a particular capacitor from previous signals, the charge on the capacitor will be increased. If the sampled signal is less in magnitude than that stored in a capacitor, the charge in the capacitor will be reduced by the bleeding action of a resistor connected thereto.

In the particular circuit disclosed, the median averaged signal is produced. However, by using known circuit components the circuit may be rearranged to produce the mean average value if such an average is desired.

It is an object of this invention to provide a post integrator capacitor storage circuit for a Deltic type correlator.

It is another object of this invention to provide a capacitor storage circuit for smoothing a correlation signal.

It is a further object to provide a capacitor storage circuit for averaging the results of a recurring signal.

Yet another object of this invention is to provide a capacitor storage device for reducing the noise level in a correlated signal.

A still further object of this invention is to produce a polarity sampled averaging device employing capacitor storage.

Other objects and many of the attendant advantages of this invention will be readily appreciated as the same becomes better understood by reference to the following detailed description when considered in connection with the accompanying drawing wherein:

The single figure of the drawing illustrates the polarity sampled averaging circuit of this invention.

Referring now to the drawing, a storage circuit is shown with monostable multivibrators 11*a*, 11*b*, 11*c*, 11*d*, 11*e* and 11*f* and storage elements 13*a*, 13*b*, 13*c*, 13*d* and 13*e*. Each of the storage elements is connected to a source of input signal and to the output of a monostable multivibrator. For example, storage element 13*a* is connected to receive input signal $V_1$ and the output of monostable multivibrator 11*a*. The circuit components of the storage elements are illustrated in storage element 13*c*. In the circuit of the storage element 13*c*, a capacitor C is shown connected at one terminal to input signal conductor 15 through diodes $D_1$ and $D_2$, and output signal conductor 17 through diodes $D_3$ and $D_4$. The other terminal of capacitor C is connected to ground potential. The output of multivibrator 11*c* is connected to a juncture between diodes $D_1$ and $D_2$ through resistor $R_1$ and to a juncture between diodes $D_3$ and $D_4$ through resistor $R_2$. A bleeder resistor $R_3$ is connected to one terminal of capacitor C and to a negative potential —V. Input signal conductor 15 is connected to a source of input voltage which applies a varying signal voltage $V_1$ to conductor 15. Output voltage conductor 17 is connected to a load resistor $R_L$ for applying an output voltage $V_0$ thereacross.

In operation, the output of a sweep voltage circuit is connected to the input of multivibrator 11*a*. The voltage peak 19 at initiation of the sweep voltage will operate to trigger multivibrator 11*a* at time $t_0$. Multivibrator 11*a* will then produce a square wave output voltage pulse 21*a* which will last from time $t_0$ to time $t_1$ which may be a period of 52 microseconds, for example. During the time period from $t_0$ to $t_1$ when multivibrator 11*a* is on, input voltage $V_1$ is applied to capacitor C. The diodes $D_1$ and $D_2$ form a gate which either increases or decreases the stored voltage of capacitor C in fixed steps depending on whether the input voltage $V_1$ is greater or less than the stored voltage $V_c$. If $V_1$ is less than $V_c$ the voltage $V_a$ at the juncture between diodes $D_1$ and $D_2$ rises only to the voltage of $V_1$. Diode $D_2$ will be back-biased and no charge will be added to the capacitor C. On the other hand, if $V_1$ is greater than $V_c$, diode $D_2$ is the first diode to conduct, and a current equal to $(V-V_c)/R_1$ flows into capacitor C and resistor $R_3$ where V is the gate voltage. If it be assumed that V is much greater than $V_c$ and that $R_3$ is large compared to $R_1$, the current flowing in capacitor C will be $V/R_1$. The voltage rise in capacitor C during the sampling time from $t_0$ to $t_1$ will then be $Vt/R_1C$, where $t$ is the time interval of the gate voltage pulse, or $t_1-t_0$, for example. The bleeder resistor $R_3$ may be of such a value that the voltage decay during the sweep repetition interval T is one-half the value of the positive step. This condition requires that $R_3=2R_1(T/_t)$. The result is a positive step of $V_t/2R_1C$ if the input voltage is greater than the stored voltage, and a net negative step of the same magnitude if the input voltage is less than the stored voltage.

The sample voltages stored in the storage elements are gated successively onto output conductor 17 by diodes $D_3$ and $D_4$. During the time in which a gate pulse is applied to a given storage element, the voltage $V_b$, at the juncture between diodes $D_3$ and $D_4$ is raised to the storage voltage $V_c$. This voltage is then applied to the output bus through diode $D_4$. All diodes in all of the other storage elements will be open at this time. Some current is fed into capacitor C through resistor $R_2$ during the readout operation, but by proper selection of $R_2$ and $R_L$, this can be made small compared to the current through $R_1$. This residual current may be compensated approximately by decreasing the value of resistor $R_3$ by a small amount. If a parallel rather than a sequential output is desired, the output gates would not be required.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A signal averaging device comprising,
a plurality of capacitors, each having first and second terminals, a source of input signals, a plurality of first gating means, each connected to said source and to said first terminal of one of said capacitors, an output circuit, a plurality of second gating means each connecting said first terminal of one capacitor to said output circuit, a plurality of ground potential terminals, a plurality of negative potential terminals, a plurality of bleeding resistors, each connected to one of said first terminals of said capacitors and to one of said negative potential terminals, said second terminals of said capacitors each connected to one ground potential terminal, a plurality of multivibrators, each connected to one of said first gating means and to one of said second gating means whereby each of said first and second gating means may be operated to connect said input signal source to each of the capacitors and each of said capacitors are connected to said output circuit when said multivibrators are energized, means serially connecting said multivibrators such that said multivibrators are energized sequentially.

2. An integrator for a delay time compression type correlator comprising, an input signal, a plurality of multivibrators, an output circuit, a plurality of storage elements, each storage element comprising a capacitor, a first gating means for applying said input signal to said storage element, a second gating means for applying a signal stored in said capacitor to said output circuit, and a bleeding resistor connected across said capacitor, said multivibrators serially connected such that the end of a pulse of one multivibrator will trigger the next multivibrator, each of said multivibrators being connected to the first and second gating means of a respective storage element, whereby said input signal may be applied to said capacitor when the voltage across said capacitor is less than the voltage of said input signal and the voltage across said capacitor may be applied to an output circuit.

3. A polarity sampled averaging device for electrical signals comprising, an input signal source, a plurality of multivibrators, a plurality of signal storage elements, a plurality of first gate means, each of said first gate means connecting a storage element to said input signal source, a plurality of second gate means, each of said second gate means connecting a signal storage element to an output circuit, a plurality of first connecting means, each of said connecting means connecting a multivibrator to a respective first and second gate means, a plurality of second connecting means serially connecting said multivibrators such that a signal pulse may be fed into said signal storage elements when the voltage of said signal pulse is greater than the voltage across said storage elements and the voltage across said signal storage elements may be fed to an output circuit sequentially.

4. In a polarity sampled averaging device, a storage element, said storage element comprising a first diode having a cathode and an anode, a second diode having a cathode and an anode, a third diode having a cathode and an anode, a fourth diode having a cathode and an anode, said cathode of said first diode connected to a source of signal voltage, said anodes of said first and second diodes connected together with a first juncture therebetween, said cathodes of said second and third diodes connected together with a second juncture therebetween, said anodes of said third and fourth diodes connected together with a third juncture therebetween, said cathode of said fourth diode connected to an output circuit, a first resistor, and a second resistor, said first and second resistors serially connected to said first and third junctures with a common juncture therebetween, said common juncture connected to a source of gating voltage, a storage capacitor for storing input signals, said capacitor connected between a ground potential and said second juncture, a bleeding resistor connected between said second juncture and a negative potential whereby signals may be stored in said capacitor when a gating voltage is applied to said common juncture.

References Cited

UNITED STATES PATENTS

| | | | |
|---|---|---|---|
| 2,976,518 | 3/1961 | Eckert | 340—173 |
| 3,064,144 | 11/1962 | Hardy | 307—88.5 |
| 3,087,143 | 4/1963 | Bayly | 340—173 |
| 3,113,631 | 12/1963 | Moulin et al. | 235—181 X |
| 3,142,822 | 7/1964 | Martin | 235—183 X |
| 3,185,958 | 5/1965 | Masterson et al. | 235—181 X |

MALCOLM A. MORRISON, *Primary Examiner.*

I. KESCHNER, J. RUGGIERO, *Assistant Examiners.*